(12) United States Patent
Martin et al.

(10) Patent No.: US 10,484,029 B2
(45) Date of Patent: Nov. 19, 2019

(54) RECEIVER OF SIGNALS, IN PARTICULAR OF GNSS SIGNALS, COMPRISING AN INTERFERENCE REJECTION FILTER, AND ASSOCIATED METHOD

(71) Applicant: THALES, Courbevoie (FR)

(72) Inventors: Nicolas Martin, Valence (FR);
Jean-Michel Perre, Valence (FR);
Nicolas Bastien, Valence (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 16/222,998

(22) Filed: Dec. 17, 2018

(65) Prior Publication Data
US 2019/0199385 A1 Jun. 27, 2019

(30) Foreign Application Priority Data

Dec. 21, 2017 (FR) .................................... 17 01348

(51) Int. Cl.
*H04B 1/10* (2006.01)
*G01S 19/21* (2010.01)
*G01S 19/37* (2010.01)

(52) U.S. Cl.
CPC ............ *H04B 1/1036* (2013.01); *G01S 19/21* (2013.01); *G01S 19/37* (2013.01); *H04B 2001/1063* (2013.01)

(58) Field of Classification Search
CPC .......... H04B 1/1036; H04B 2001/1063; G01S 19/21; G01S 19/37
See application file for complete search history.

(56) References Cited

U.S. PATENT DOCUMENTS

| 5,291,525 A * | 3/1994 | Funderburk | H04H 20/49 375/345 |
| 6,321,073 B1 * | 11/2001 | Luz | H03G 3/3068 330/278 |
| 6,816,539 B1 | 11/2004 | Rog | |
| 2002/0032570 A1 * | 3/2002 | Kub | A22B 5/0017 704/500 |
| 2007/0052478 A1 * | 3/2007 | Candy | H03F 1/32 330/251 |
| 2007/0140391 A1 * | 6/2007 | Pan | H04B 1/0032 375/350 |
| 2007/0170984 A1 * | 7/2007 | Andersen | H03F 1/3264 330/10 |
| 2008/0254347 A1 * | 10/2008 | Palladino | G01R 31/367 429/90 |

(Continued)

FOREIGN PATENT DOCUMENTS

EP 2 336 800 A1 6/2011

*Primary Examiner* — Dominic E Rego
(74) *Attorney, Agent, or Firm* — Baker & Hostetler LLP

(57) ABSTRACT

A receiver of signals likely to be disturbed by an interfering signal, the receiver includes an interference rejection filter comprising a multiplying gain applied respectively to an in-phase channel and an in-quadrature channel of a signal received by the receiver, the value of the multiplying gain being determined by a nonlinear function $K_i(\rho)$ of the modulus $\rho$ of the received signal, the function $K_i(\rho)$ being determined so as to maximize the signal-to-noise ratio after application of the multiplying gain and demodulation of the received signal.

19 Claims, 9 Drawing Sheets

(56) References Cited

U.S. PATENT DOCUMENTS

| | | | |
|---|---|---|---|
| 2009/0004990 A1 | 1/2009 | Renard et al. | |
| 2009/0154599 A1* | 6/2009 | Siti | H04L 1/0052 |
| | | | 375/320 |
| 2011/0188614 A1* | 8/2011 | Chen | H04L 27/06 |
| | | | 375/330 |
| 2012/0314821 A1 | 12/2012 | Kirby et al. | |
| 2013/0101300 A1* | 4/2013 | Weisser | H03G 3/3084 |
| | | | 398/208 |
| 2013/0287410 A1* | 10/2013 | Leven | H04B 10/61 |
| | | | 398/208 |
| 2014/0098908 A1* | 4/2014 | Rangachari | H04L 25/061 |
| | | | 375/319 |

\* cited by examiner

RECEIVER OF SIGNALS, IN PARTICULAR OF GNSS SIGNALS, COMPRISING AN INTERFERENCE REJECTION FILTER, AND ASSOCIATED METHOD

CROSS-REFERENCE TO RELATED APPLICATIONS

This application claims priority to foreign French patent application No. FR 1701348, filed on Dec. 21, 2017, the disclosure of which is incorporated by reference in its entirety.

FIELD OF THE INVENTION

The invention relates to the field of receivers of signals which are likely to be disturbed by an interfering signal. The invention relates in particular to the field of the receivers of satellite radionavigation signals, or GNSS receivers. It relates to a receiver comprising an interference rejection filter.

BACKGROUND

A general objective of the invention is to allow a correct demodulation of the signals received by a receiver even when the latter are disturbed by an interfering signal with constant envelope, that is to say with constant amplitude. More specifically, an objective of the invention is to enhance the efficiency, that is to say the signal-to-noise ratio, after demodulation, when the received signal superimposed on an interfering signal with constant envelope.

One possible solution for demodulating a signal disturbed by an interfering signal with constant envelope is described in the European patent application EP 2336800. This solution is based on a quantization of the signal on three levels: +1, 0 and −1. It entails quantizing the analogue signal specifically on the extrema and the 0 crossings of the signal to maximize the sensitivity relative to the useful signal without increasing the power of the noise. This solution presents the drawback of requiring a very precise locking of the automatic gain control in order to accurately position the amplitude of the received analogue signal relative to the quantization thresholds of the analogue-digital converter. Moreover, this solution offers sub-optimal efficiency.

Other receivers use a technique consisting in removing, from baseband complex digitized received signal, a component whose modulus is equal to the estimated mean modulus of the received signal and direction is equal to that of the received signal. This technique presents the drawback of requiring an architecture comprising algorithms of CORDIC (coordinate rotation digital computer) type in cascaded arrangement, which are complex to implement.

SUMMARY OF THE INVENTION

The invention proposes implementing an interference rejection filter which essentially comprises the application of a nonlinear function in the form of a multiplying gain, to the in-phase and in-quadrature channels of the received and digitized signal. The proposed solution offers reduced implementation complexity and optimal efficiency.

The subject of the invention is a receiver of signals likely to be disturbed by an interfering signal, the receiver comprising an interference rejection filter comprising a multiplying gain applied respectively to an in-phase channel I and an in-quadrature channel Q of a signal received and digitized by the receiver, the value of the multiplying gain being determined by a nonlinear function $K_i(\rho)$ of the modulus $\rho$ of the received signal, the function $K_i(\rho)$ being determined so as to maximize the signal-to-noise ratio after application of the multiplying gain and demodulation of the received signal.

According to a particular aspect of the invention, the nonlinear function $K_i(\rho)$ depends on the probability density $f(\rho)$ of the received signal, a function of the modulus $\rho$ of the signal.

According to a particular aspect of the invention, the nonlinear function $K_i(\rho)$ depends on the ratio between the derivative $f'(\rho)$ of the probability density of the received signal as a function of the modulus and the probability density $f(\rho)$ of the received signal, divided by the modulus $\rho$ of the received signal.

According to a particular aspect of the invention, the interference rejection filter comprises a unit for computing the modulus of the received signal from the in-phase channel and from the in-quadrature channel of the received signal, the multiplying gain being implemented by a memory in which are saved a plurality of values of the nonlinear function $K_i(\rho)$, the memory having a first input linked to the output of the modulus computation unit.

According to a particular aspect of the invention, the multiplying gain is implemented by a memory in which are saved a plurality of values of the nonlinear function $K_i(\rho)$, the memory having a first input intended to receive the absolute value of the in-phase channel of the signal, a second input intended to receive the absolute value of the in-quadrature channel of the signal.

According to a particular aspect of the invention, the nonlinear function $K_i(\rho)$ depends on an a priori estimate of a ratio J/N between the power of an interfering signal and the power of a thermal noise.

According to a particular embodiment, the receiver of signals according to the invention further comprises an estimator of a ratio J/N between the power of an interfering signal and the power of a thermal noise, the nonlinear function $K_i(\rho)$ depending on said ratio J/N.

According to a particular embodiment of the invention, the estimator of a ratio between the power of an interfering signal and the power of a thermal noise comprises a unit for computing the fourth order moment of the modulus of the signal.

According to a particular embodiment of the invention, the unit for computing the fourth order moment comprises an adder for summing the in-phase channel of the signal, raised to the power of 2, and the in-quadrature channel of the signal, raised to the power of 2, a multiplier for raising to the power of 2 the output of the adder and an averaging filter.

According to a particular embodiment of the invention, the estimator of a ratio between the power of an interfering signal and the power of a thermal noise further comprises a member for computing the ratio between the fourth order moment of the signal and the second order moment of the signal raised to the power of 2.

According to a particular embodiment, the receiver of signals according to the invention comprises at least one automatic gain control device configured to control the amplitude of the received signal in accordance with a power setpoint, the second order moment of the signal being taken to be equal to the power setpoint of the automatic gain control.

According to a particular aspect of the invention, the probability density $f(\rho)$ of the modulus of the received signal is determined, for a plurality of values of the ratio J/N between the power of an interfering signal and the power of a thermal noise, from the value of the amplitude of the interfering signal and from the standard deviation of the thermal noise.

According to a particular aspect of the invention, the memory has an additional input linked to the output of the estimator of the ratio J/N.

According to a particular aspect of the invention, the interfering signal has a constant envelope.

According to a particular aspect of the invention, the received signals are satellite radionavigation signals.

Also a subject of the invention is a method for receiving signals likely to be disturbed by an interfering signal, comprising the steps of:
- receiving respectively an in-phase channel I and an in-quadrature channel Q of a signal,
- computing a multiplying gain from a nonlinear function $K_i(\rho)$ of the modulus $\rho$ of the received signal, the nonlinear function $K_i(\rho)$ being determined so as to maximize the signal-to-noise ratio after application of the multiplying gain and demodulation of the received signal;
- applying the multiplying gain respectively to the in-phase channel I and to the in-quadrature channel Q of the digitized signal.

According to a particular embodiment, the method for receiving signals according to the invention further comprises a step of estimation of a ratio J/N between the power of an interfering signal and the power of a thermal noise, the nonlinear function $K_i(\rho)$ depending on said ratio J/N.

BRIEF DESCRIPTION OF THE DRAWINGS

Other features and advantages of the present invention will become more apparent on reading the following description in relation to the attached drawings which represent.

DETAILED DESCRIPTION

Figure 1:
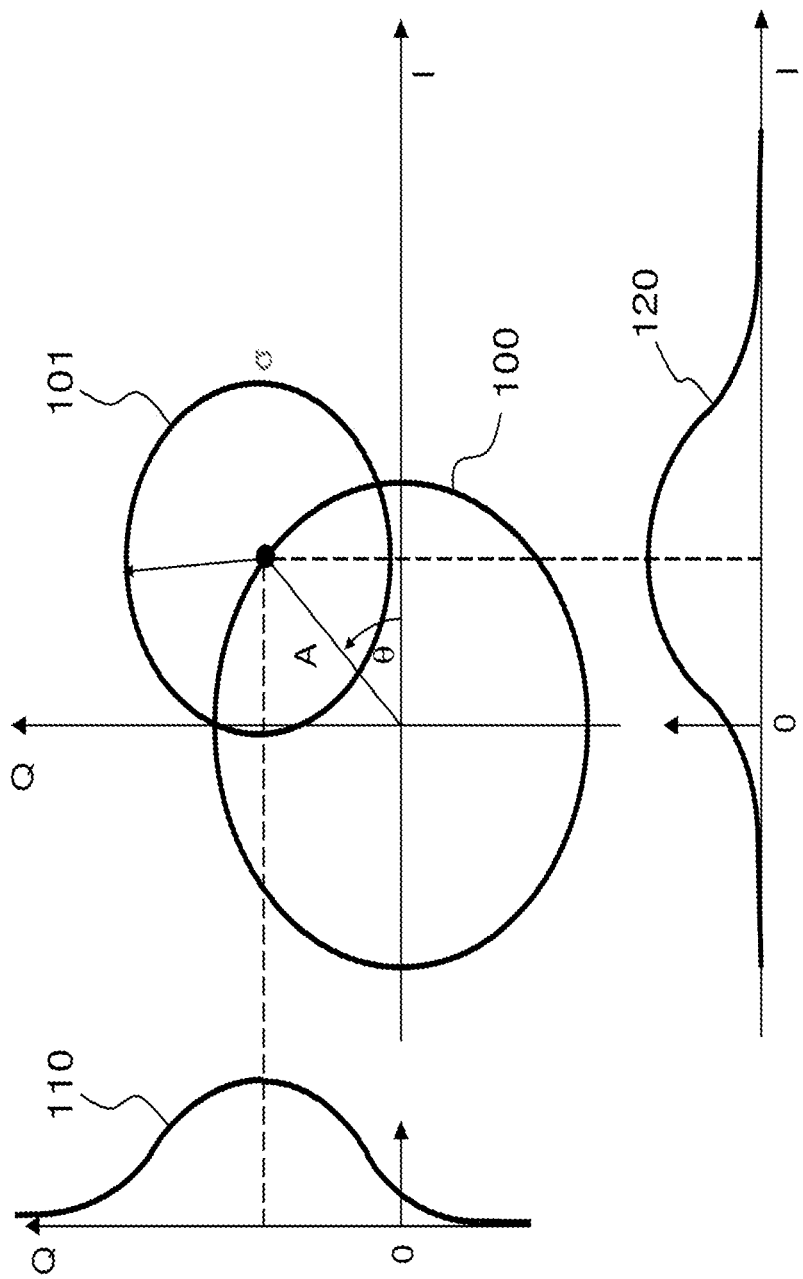
FIG. 1, a diagram illustrating the probability density of an interfering signal with constant envelope to which is added a Gaussian white noise, FIG. 2, a block diagram of a receiver of signals according to the invention, FIG. 3, a block diagram of a first variant implementation of a receiver of signals according to the invention, FIG. 4, a block diagram of a second variant implementation of a receiver of signals according to the invention, FIG. 5, a diagram representing the probability density of an interfering signal with constant envelope to which is added a Gaussian white noise for different ratios between the power of the interfering signal and the power of the noise, FIG. 6, a diagram representing the optimal gain to be applied to the received signal as a function of the modulus of the signal and for different ratios between the power of the interfering signal and the power of the noise, FIG. 7, a zoom in on the diagram of FIG. 6 over a more reduced range of values, FIG. 8, a diagram representing the signal-to-noise ratio losses due to the interfering signal with and without application of the invention, FIG. 9, a flow diagram describing the steps of a method for receiving a signal according to the invention.

The invention consists in applying an anti-interference filter to the signal received by a receiver, on the in-phase channel and the in-quadrature channel of the signal, after digitization of the signal.

The received analogue signal is first of all transposed into baseband on an in-phase channel I and an in-quadrature channel Q then digitized by means of an analogue-digital converter.

According to one embodiment of the invention, the receiver also comprises an automatic gain control device, on each channel I, Q, which makes it possible to ensure a constant average power of the signal on each channel. In another embodiment of the invention, the automatic gain control is not present.

The anti-interference filter consists in the application of a nonlinear function to the complex signal represented by the channels I, Q.

The theory on which the invention is based is described first of all.

In the presence of non-Gaussian noise, it is possible to enhance the signal-to-noise ratio of the signal after demodulation by applying a nonlinear function f to the signal upstream of the demodulation.

In the presence of an interfering signal with constant envelope, the noise affecting the received signal is non-Gaussian, so this theory can therefore be applied.

$I_{optimal}$ and $Q_{optimal}$ denote the in-phase (respectively in-quadrature) signals after application of the anti-interference filter. The signal-to-noise ratio measured on these signals is optimal when a nonlinear function is applied to the signal as defined by the following relationships:

$$I_{optimal}(I,Q) = -\partial P/\partial I/P(I,Q) \quad (1)$$

$$Q_{optimal}(I,Q) = -\partial P/\partial Q/P(I,Q) \quad (2)$$

P(I,Q) is the probability density of the signal according to the two dimensions I and Q.
$\partial P/\partial I$ is the partial derivative of P relative to I.
$\partial P/\partial Q$ is the partial derivative of P relative to Q.
The relationships (1) and (2) are demonstrated in appendix 1 at the end of the description.

It is assumed that the probability density follows a symmetry of revolution in the plane (I, Q) relative to the point (0, 0). This hypothesis is legitimate insofar as the channels I and Q play an equivalent, interchangeable role, linked to the unknowns of the clock of the receiver at the moment of the transition to baseband.

It is assumed that $P(I,Q)=f(\rho)$, with $\rho$ the modulus of the complex signal whose real part corresponds to the in-phase channel I and whose imaginary part corresponds to the in-quadrature channel Q.

Moreover, the following apply: $\partial P/\partial I = \partial P/\partial \rho \cdot \partial \rho/\partial I + \partial P/\partial \theta \cdot \partial \theta/\partial I$.

In polar notation, the following applies: $I+jQ=\rho \exp(j\theta)$
Knowing that $\partial P/\partial \theta = 0$, $\partial P/\partial \rho = f'(\rho)$ and $\partial \rho/\partial I = I/\rho$, the relationship (1) becomes:

$$I_{optimal}(I,Q) = -\partial P/\partial I/P(I,Q) = -\partial \rho/\partial I.f'(\rho)/f(\rho) = -I/\rho.f'(\rho)/f(\rho) = I.K(\rho).$$

Likewise, the relationship (2) becomes:

$$Q_{optimal}(I,Q) = -\partial P/\partial Q/P(I,Q) = -\partial \rho/\partial Q.f'(\rho)/f(\rho) = -Q/\rho.f'(\rho)/f(\rho) = Q.K(\rho)$$

Thus, the nonlinear function to be applied to the signal is:

$$K(\rho) = -1/\rho.f'(\rho)/f(\rho) \quad (3)$$

To compute $K(\rho)$, it is first necessary to determine the probability density $f(\rho)$. The probability density of a signal composed of an interfering signal with constant amplitude A and a Gaussian noise of variance $\sigma^2$ is given by the following formula:

$$f(\rho) = P(I, 0) = \int_0^{2\pi} \frac{1}{2\pi} \frac{1}{\left(\sqrt{2\pi}\,\sigma\right)^2} \exp \quad (4)$$
$$\left(-\frac{(I - A.\cos\theta)^2 + (A.\sin\theta)^2}{2\sigma^2}\right) d\theta \quad \text{for } I = \rho$$

FIG. 1 schematically represents, on an I,Q diagram, the appearance of an interfering signal 100 with constant amplitude A and variable phase θ, to which is added a Gaussian noise 101. The probability density P of the resulting signal is represented in projection on the I axis by the curve 120 and in projection on the Q axis by the curve 110.

The probability density f(ρ) therefore depends only on the ratio $J/N=A^2/\sigma^2$ between the power of the interfering signal and the power of the Gaussian noise.

From the principles described above, the invention proposes a receiver 200 comprising an interference rejection filter which consists in applying, to each of the channels I and Q of the digital signal, a gain K(ρ) dependent on the modulus of the signal and on the ratio J/N.

Figure 2:
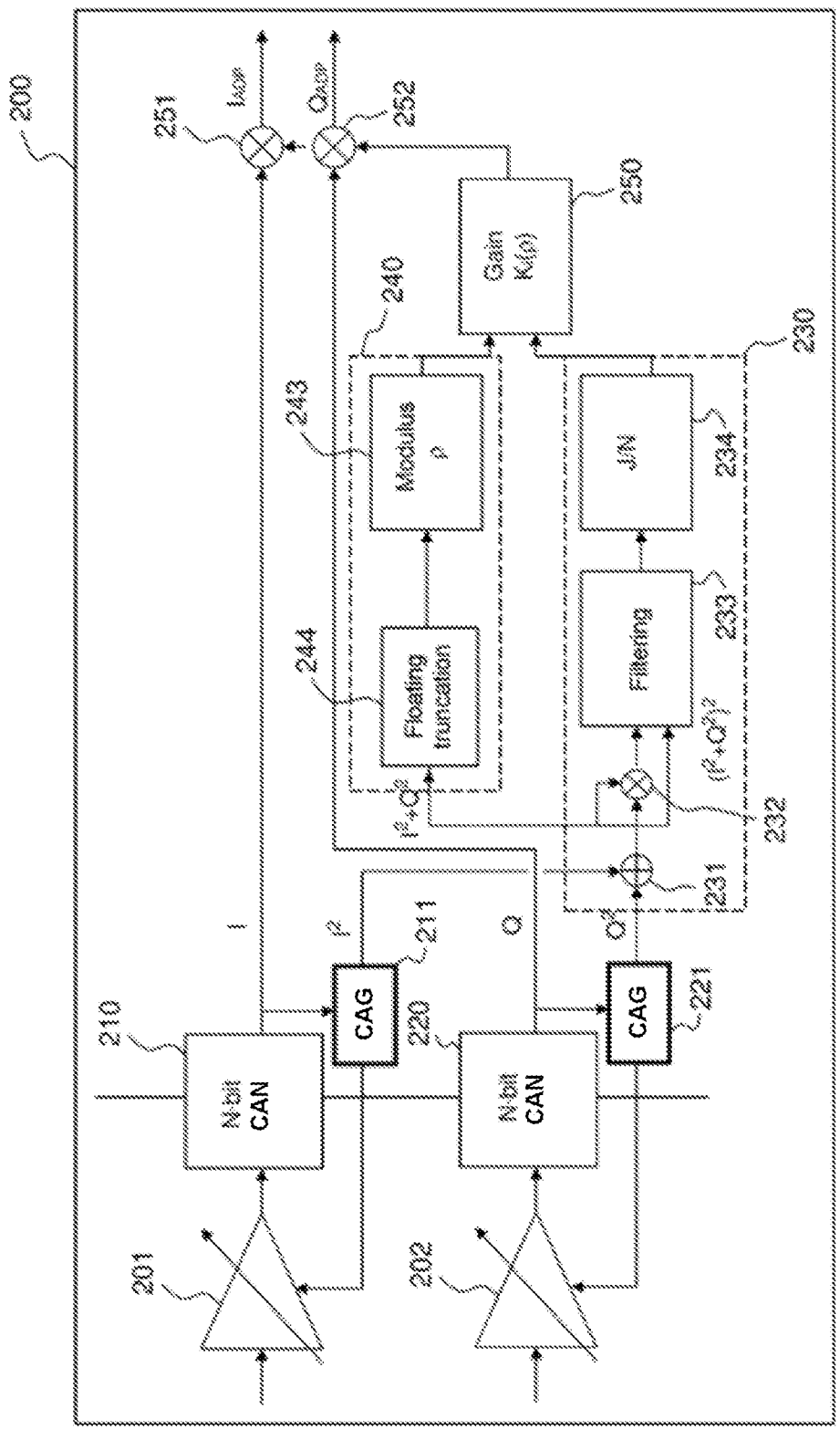

The receiver 200 thus comprises two channels for receiving the signal in phase I and in quadrature Q resulting from the transposition of the baseband analogue signal (not represented in FIG. 2).

The receiver 200 comprises in particular, on each of the channels I, Q, an amplifier 201, 202, an analogue-digital converter 210, 220 and an automatic gain control device 211, 221 for guaranteeing a power of the signal that is constant on each channel before digitization of the signal.

The receiver 200 also comprises an anti-interference filter, comprising a multiplying gain $K_i(\rho)$ 250 which receives as input, on the one hand, the modulus ρ of the signal computed by a computation unit 240 and, on the other hand, an estimate i of the ratio J/N determined by an estimator 230.

According to a particular embodiment of the invention, the ratio J/N can be estimated by calculating the ratio between the fourth order moment of the signal and the second order moment raised to the power of 2.

To this end, the estimator 230 comprises an adder 231 for summing the signals raised to the power of 2 at the output of the respective automatic gain control devices 211, 221 of the channels I and Q and a multiplier 232 for raising the output of the adder 231 to the power of 2.

The estimator 230 also comprises a filter 233 for producing an average of the output $(I^2+Q^2)^2$ of the multiplier 232 in order to calculate the fourth order moment. The filter 233 is also configured to produce an average of the output $I^2+Q^2$ of the adder 231, then raise the average to the power of 2 in order to calculate the second order moment raised to the power of 2. The estimate of the ratio J/N is then obtained by establishing the ratio between the fourth order moment of the signal and the second order moment raised to the power of 2.

The calculation of the second order moment is in particular necessary in the absence of an automatic gain control device 211, 221 or, more generally, when the power of the received signal cannot be considered constant.

Alternatively, when an automatic gain control device 211, 221 is used, as illustrated in FIG. 2, it can be considered that the power of the received signal is constant. In this case, the second order moment can be directly taken to be equal to the power setpoint used by the automatic gain control devices 211, 221 used to correct the amplitude of the received signals.

In this case, the calculation of the second order moment of the signal is not necessary.

The computation unit 240 essentially comprises a unit 243 for calculating the modulus ρ of the signal which can be implemented, for example, by means of a table which encodes the values of the square root of $I^2+Q^2$, or by a direct calculation, depending on the receiver complexity constraints.

Optionally, in order to limit the number of bits and therefore the capacity of the table used to implement the calculation of the modulus ρ, the computation unit 240 comprises a member 244 for truncating the output of the adder 231 to limit the number of bits at the input of the unit 243.

In the case where the receiver does not comprise an automatic gain control device 211, 221 or more generally the power of the signal cannot be assumed to be constant, the unit 243 for computing the modulus ρ of the signal comprises a computation of the average power of the signal and a normalization of the modulus ρ by the square root of the computed average power.

The multiplying gain 250 $K_i(\rho)$ can be implemented in the form of a table which stores different values of the nonlinear function K(ρ) as a function of the possible values of the modulus ρ and of the ratio J/N.

The receiver 200 finally comprises two multipliers 251, 252 on each of the channels I, Q of the digitized signal, for multiplying the signal by the gain supplied by the table 250.

Without departing from the context of the invention, any other implementation of the anti-interference filter making it possible to produce the same correction function for the channels I and Q of the signal by a corrective gain computed from the relationship (3), is possible.

Figure 3:
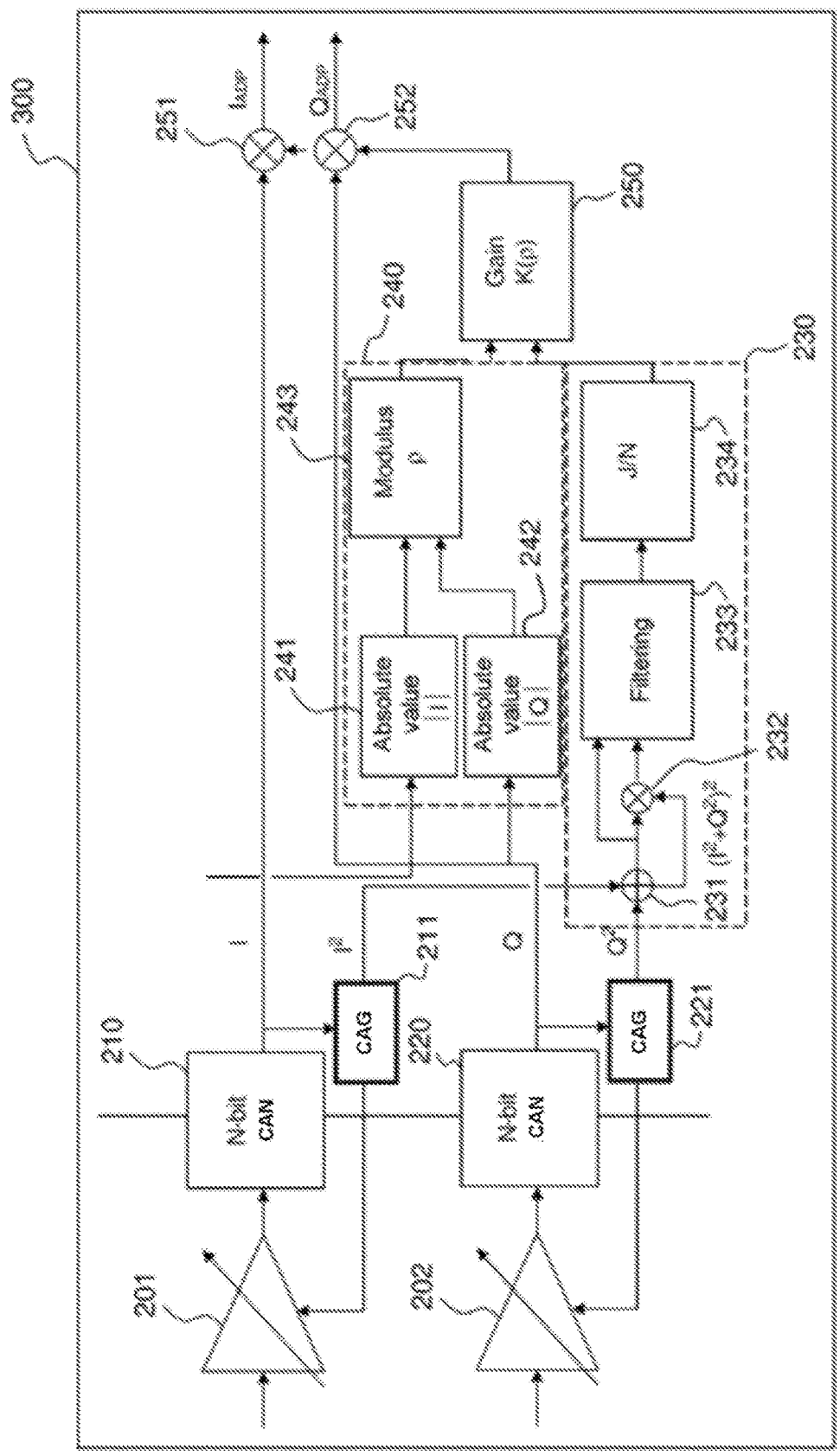

FIG. 3 schematically represents a variant embodiment 300 of the receiver according to the invention.

In this variant, the computation unit 240 comprises a first unit 241 for computing the absolute value of the in-phase channel I of the signal and a second unit 242 for computing the absolute value of the in-quadrature channel Q of the signal which feed the table 243 for computing the modulus ρ of the signal whose values are directly pre-computed as a function of the values of |I| and |Q|.

Figure 4:
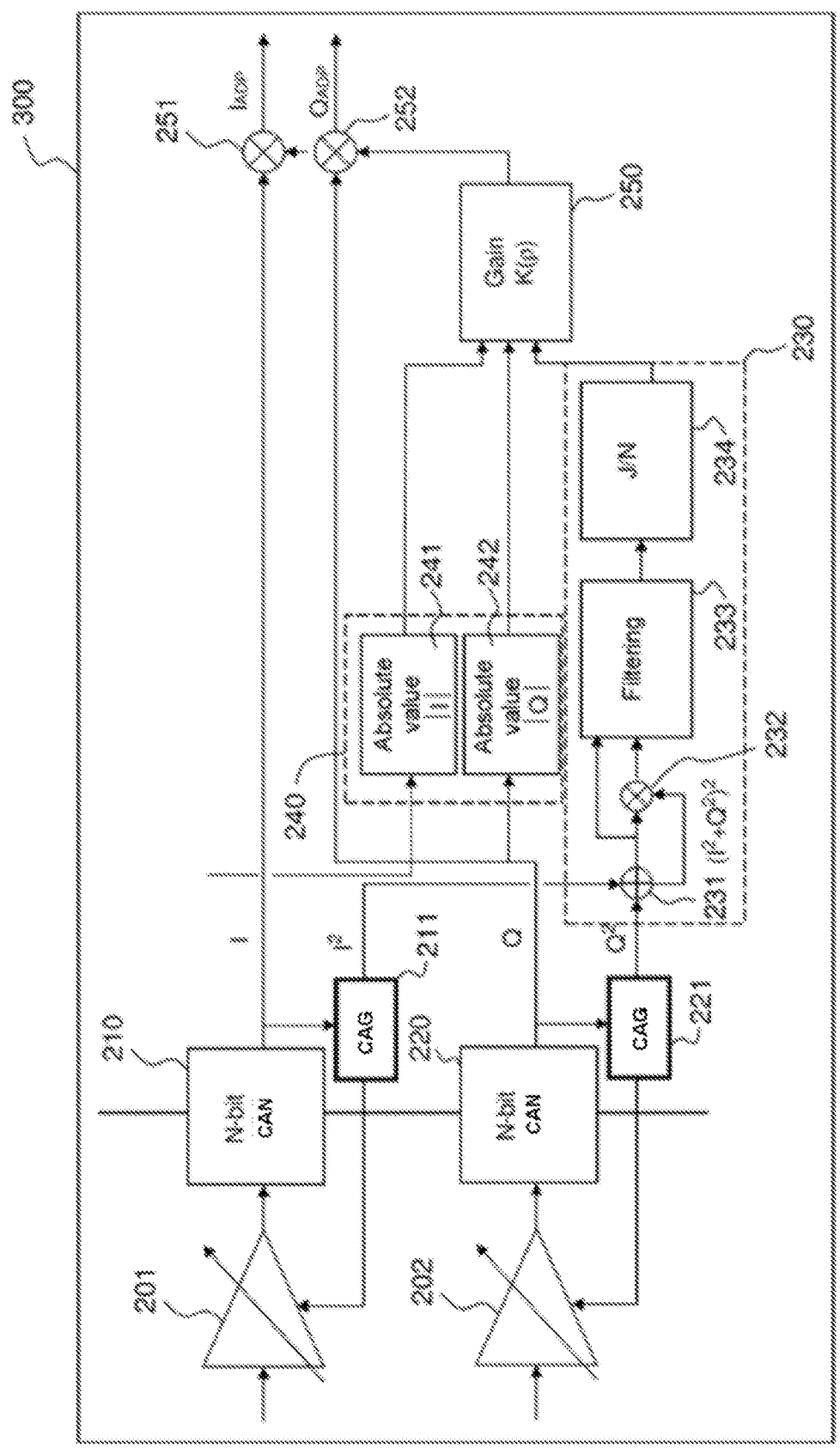

FIG. 4 schematically represents another variant embodiment 400 of the receiver according to the invention.

In this variant, the table 250 for computing the gain $K_i(\rho)$ comprises three inputs instead of two. The values of the gain $K_i(\rho)$ are directly precomputed as a function of the ratio J/N and of the absolute values of I and Q supplied by the computation units 241,242.

In a particular embodiment of the invention not represented in the figures, the estimator 230 of the ratio J/N is eliminated and an a priori value is set for the ratio J/N, for example a maximum value corresponding to a worst case. This a priori value is used to compute the nonlinear function K(ρ). In this particular embodiment, the table 250 storing the values of the multiplying gain comprises only a single input linked to the output of the unit 243 for computing the modulus ρ. This particular embodiment is applicable to the architectures described in FIGS. 2, 3 and 4 in which, to implement this embodiment, the estimator 230 is eliminated and the table 250 respectively comprises a single input (FIG. 2 and FIG. 3) or two inputs (FIG. 4).

Figure 5:
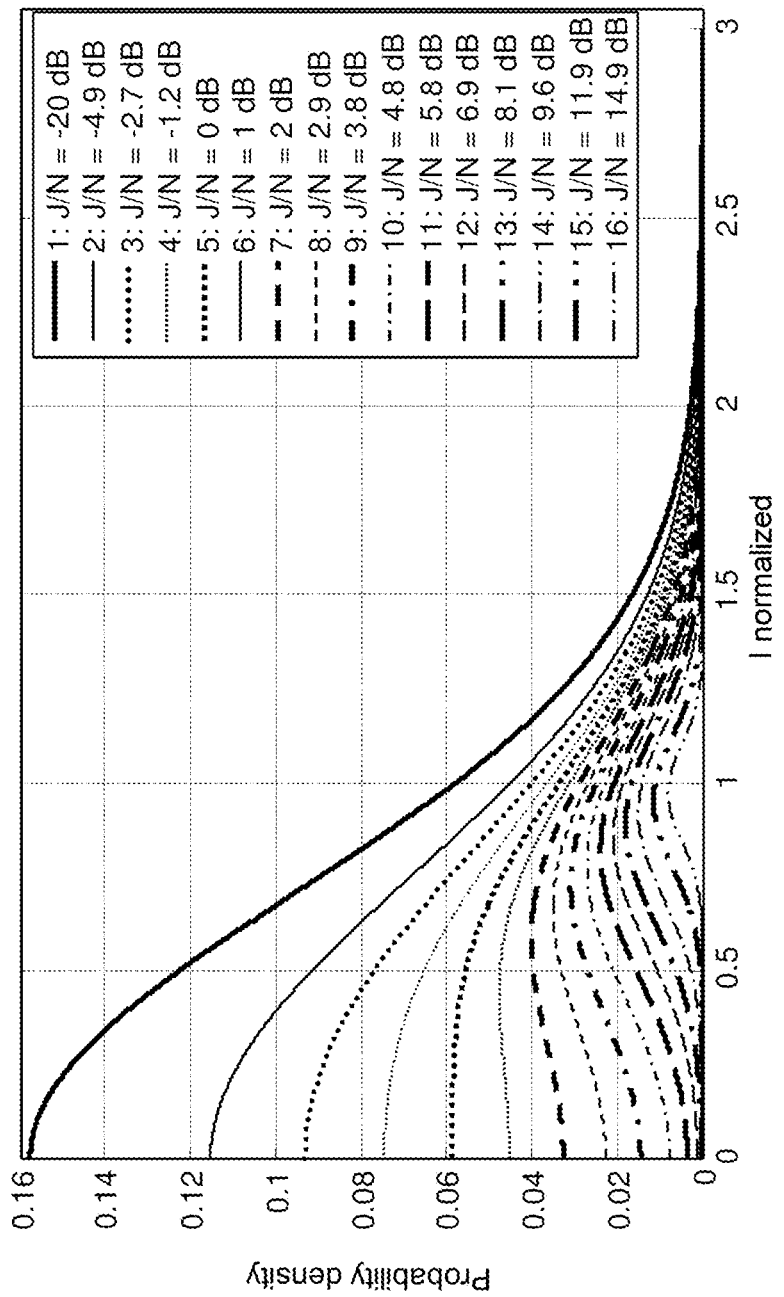

FIG. 5 represents, on a diagram, the probability density f(ρ), for example estimated by means of the relationship (4) for sixteen different values of the ratio J/N, as a function of the value of the signal on the channel I, this value being normalized. The same curves are obtained for the channel Q.

Figure 6:
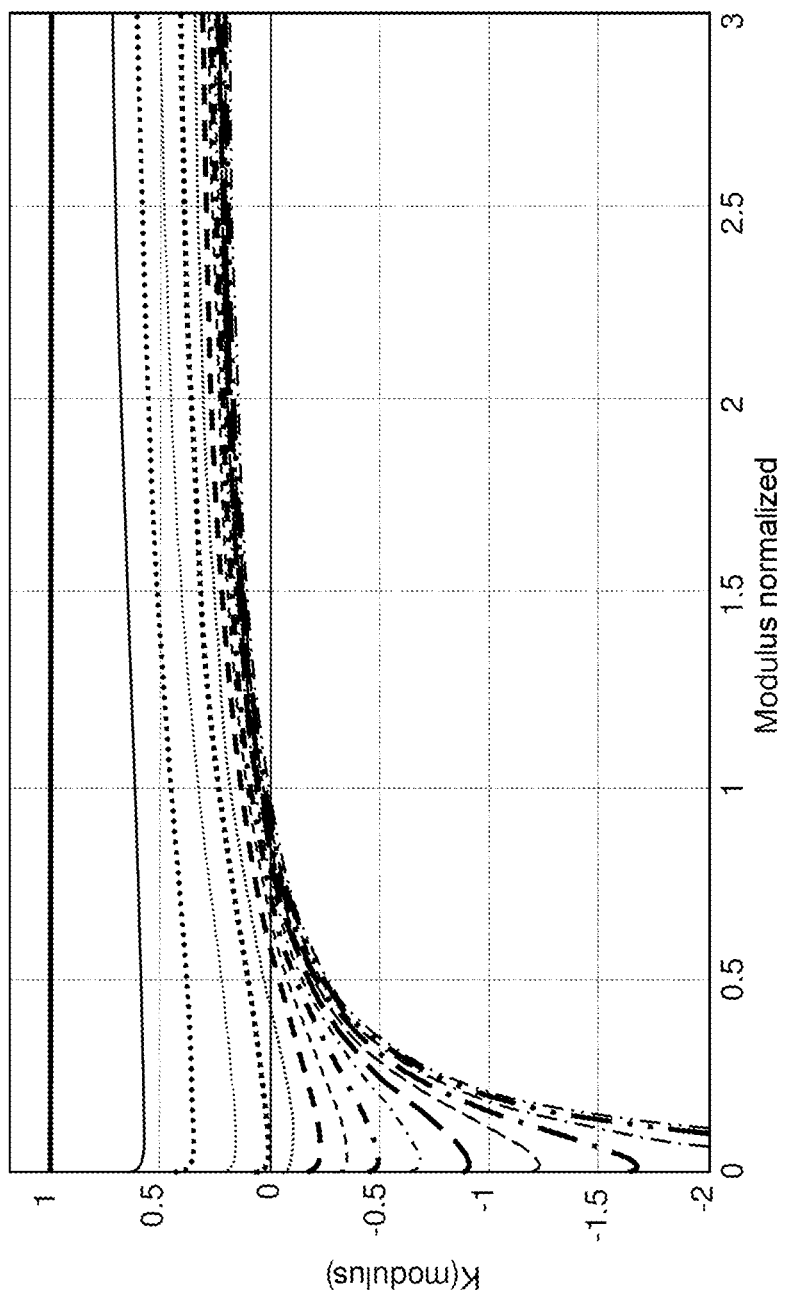

From the curves of FIG. 5, values are deduced therefrom for the gain $K_i(\rho)$ as a function of the different values of the ratio J/N and of the modulus of the normalized signal, which are represented by the curves of FIG. 6.

Figure 7:
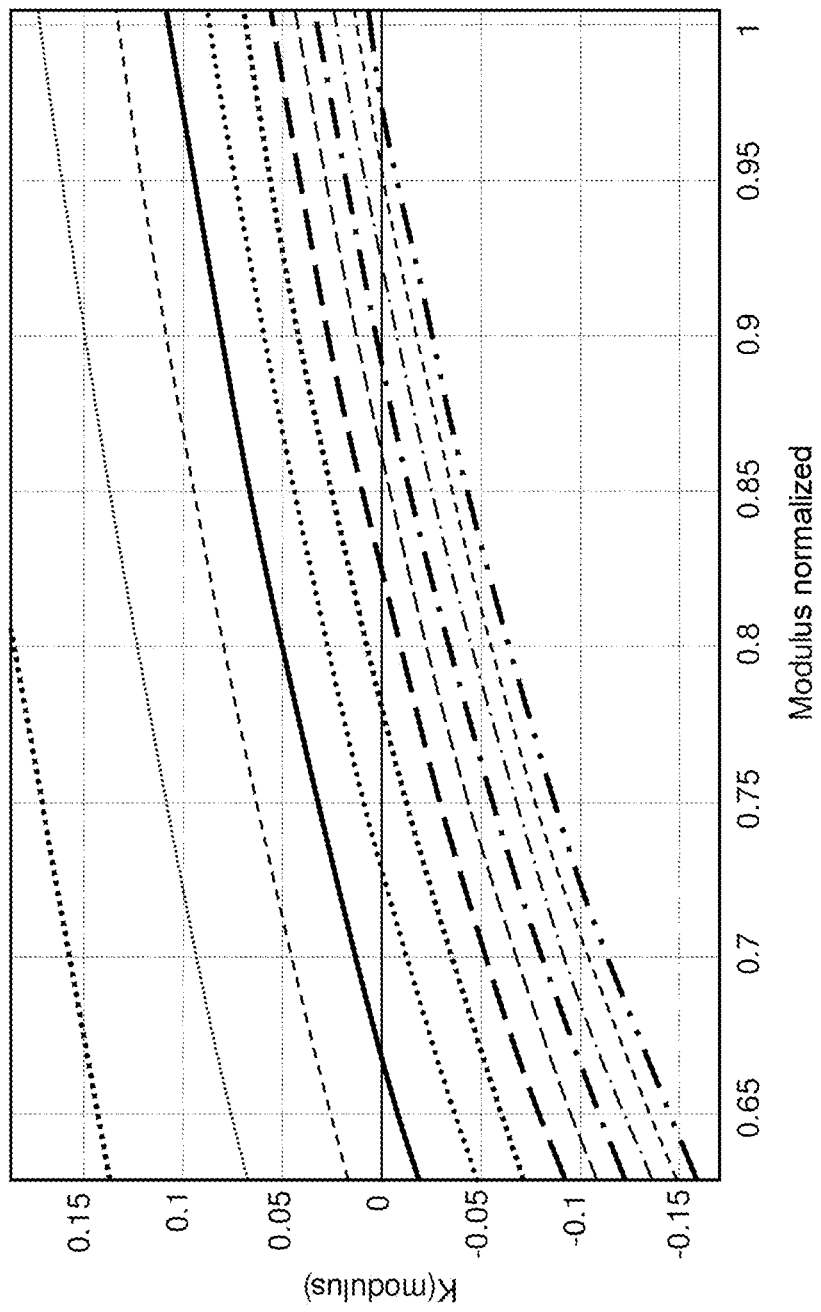

FIG. 7 represents a zoom in on FIG. 6 over a reduced range of values.

The table 250 thus contains different precomputed values of the gain $K_i(\rho)$ using the curves of FIG. 6 or 7.

Figure 8:
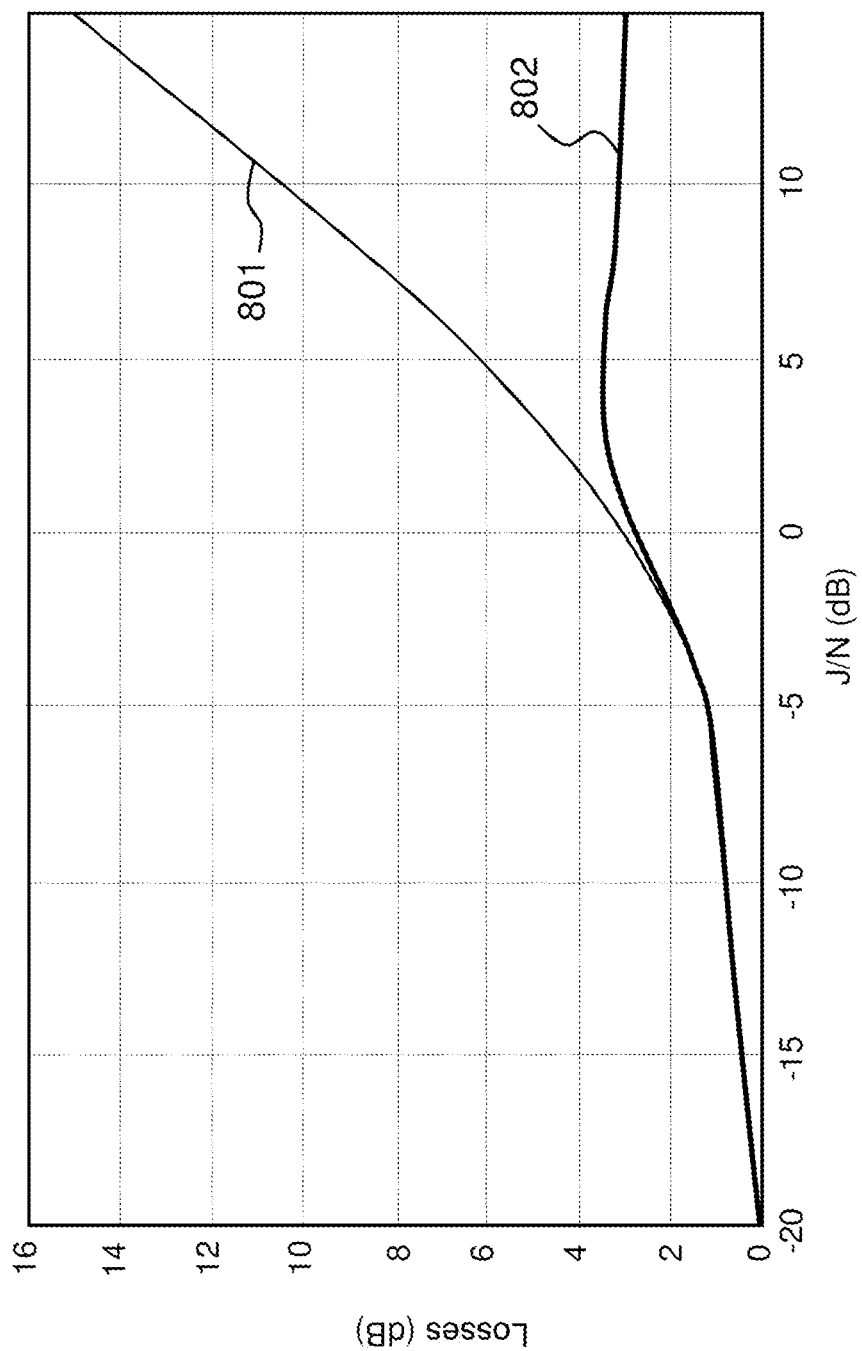

FIG. 8 represents the signal-to-noise ratio losses (expressed in dB) due to the presence of the interfering signal respectively without (curve 801) and after (curve 802) application of the invention, as a function of the ratio J/N (expressed in dB).

A gain in performance levels is noted when using the invention from a ratio of J/N greater than 0 dB. It is also seen that the invention makes it possible to greatly improve the efficiency of the receiver for ratios between the power of the interfering signal and the power of the useful signal greater than 0 dB. By using the invention, the signal-to-noise ratio losses are limited to 3 dB whatever the level of the interfering signal.

The invention applies for any type of receiver of signals, in particular for receivers of satellite radionavigation signals.

The receiver according to the invention can be implemented by software or hardware means or by a combination of software and hardware techniques.

For example, the receiver according to the invention or each of the elements of which it is composed, can be implemented by means of a processor which can be a generic processor, a specific processor, an application-specific integrated circuit (also known by the acronym ASIC) or a field-programmable gate array (also known by the acronym FPGA). The invention can use one or more dedicated electronic circuits or a general-purpose circuit. The technique of the invention can be produced on a reprogrammable computation machine (a processor or a microcontroller for example) executing a programme comprising a sequence of instructions, or on a dedicated computation machine (for example a set of logic gates such as an FPGA or an ASIC, or any other hardware module).

Figure 9:
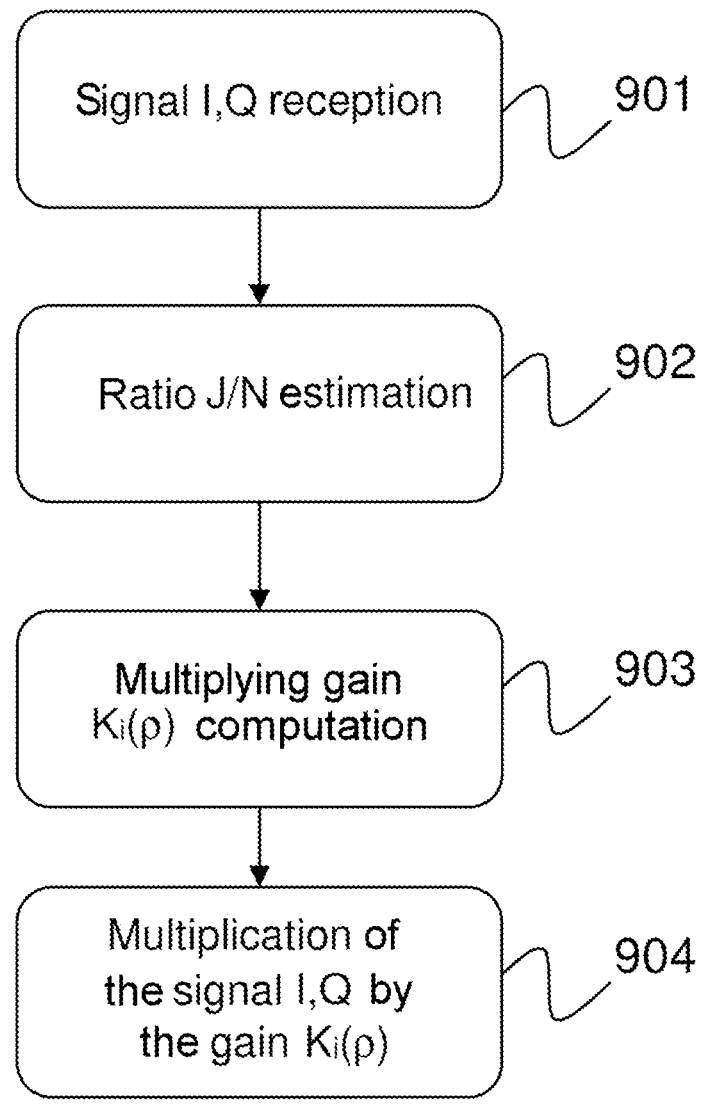

FIG. 9 represents a flow diagram describing the steps of a method for receiving signals according to the invention.

According to the implementation of this method, in a step 901, a signal is received respectively on an in-phase channel I and an in-quadrature channel Q, for example after transposition of a received signal into baseband. In a step 902, a ratio J/N is estimated between the power of an interfering signal and the power of a thermal noise as described previously. In a step 903, the multiplying gain $K_i(\rho)$ is computed in the manner described above, then, in a step 904, the multiplying gain is applied respectively to the in-phase channel I and to the in-quadrature channel Q of the signal.

In a particular embodiment of the invention, the step 902 of estimation of the ratio J/N is omitted and a predetermined value of the ratio J/N is a priori set for computing a single curve of the multiplying gain $K(\rho)$ as a function of the modulus $\rho$ of the signal.

Appendix 1

This appendix aims to demonstrate the principle given by the relationships (1) and (2) whereby the signal-to-noise ratio measured on the signals $I_{optimal}$ and $Q_{optimal}$ is optimal when a nonlinear function is applied to the signal I, Q as defined by the following relationships, in which P(I,Q) is the probability density of the signal in two dimensions:

$$I_{optimal}(I,Q) = -\partial P/\partial I/P(I,Q) \quad (1)$$

$$Q_{optimal}(I,Q) = -\partial P/\partial Q/P(I,Q) \quad (2)$$

To demonstrate this principle, X is considered to be a non-centred random variable, of average m which corresponds to a real signal, that is to say to a single channel I or Q. The odd (or anti-symmetrical) nonlinear function f is sought that is independent of m and which maximizes the signal-to-noise ratio of the variable Y=f(X).

$P_{X,m}(x)$ denotes the probability density of the variable X as a function of x and $P_{Y,m}(y)$ denotes the probability density of Y as a function of y.

The following hypotheses are also set:

$P_{X,m}(x) = P_{X,0}(x-m)$, because the probability density is invariant by translation of the average m.

$\int_{[-\infty,+\infty]} P_{X,0}(x) \, dx = 1$ because $P_{X,0}$ is a probability density.

$\int_{[-\infty,+\infty]} x \, P_{X,0}(x) \, dx = 0$ which reflects the fact that the average of $P_{X,0}$ is nil.

$\int_{[-\infty,+\infty]} x^2 \, P_{X,0}(x) \, dx = \sigma^2$ with $\sigma^2$ the variance of X and $\sigma$ the standard deviation.

The following properties can be formulated:

$$P_{X,m}(x) = f'(x) \cdot P_{Y,m}(y) = dy/dx \cdot P_{Y,m}(y)$$

$$P_{X,m}(x) \cdot dx = P_{Y,m}(y) \cdot dy$$

The average of the variable X respects the following properties:

$$M_X(m) = \int_{[-\infty,+\infty]} x \cdot P_{X,m}(x) \, dx$$

$$M_X(m) = \int_{[-\infty,+\infty]} x \cdot P_{X,0}(x-m) \, dx$$

$$M_X(m) = \int_{[-\infty,+\infty]} (x-m) \cdot P_{X,0}(x-m) \, dx + m \int_{[-\infty,+\infty]} P_{X,0}(x-m) \, dx$$

$$M_X(m) = \int_{[-\infty,+\infty]} u \cdot P_{X,0}(u) \, du + m \int_{[-\infty,+\infty]} P_{X,0}(u) \, du$$
(change of variable: $u=x-m$)

$$M_X(m) = m$$

The variance of the variable X respects the following properties:

$$V_X(m) = \int_{[-\infty,+\infty]} (x-m)^2 \cdot P_{X,m}(x) \, dx$$

$$V_X(m) = \int_{[-\infty,+\infty]} (x-m)^2 \cdot P_{X,0}(x-m) \, dx$$

$$V_X(m) = \int_{[-\infty,+\infty]} u^2 \cdot P_{X,0}(u) \, du \text{ (change of variable: } u=x-m)$$

$$V_X(m) = \sigma^2$$

The average m characterizes the share of useful signal in the variable X.

The variance $\sigma^2$ characterizes the share of noise in the variable X.

The average of the variable Y respects the following properties:

$$M_Y(m) = \int_{[-\infty,+\infty]} y \cdot P_{Y,m}(x) \, dy$$

$$M_Y(m) = \int_{[-\infty,+\infty]} f(x) \cdot P_{X,m}(x) \, dx \text{ (change of integration variable)}$$

The variance of the variable Y respects the following properties:

$$V_Y(m) = \int_{[-\infty,+\infty]} y^2 \cdot P_{Y,m}(x) \, dy$$

$$V_Y(m) = \int_{[-\infty,+\infty]} f(x)^2 \cdot P_{X,m}(x) \, dx \text{ (change of integration variable)}$$

From these properties, it is possible to calculate the signal-to-noise ratio of the variables X and Y.

The signal-to-noise ratio for the variable X is: $S/N_{X,m} = (M_{X,m})^2/V_{X,m} = m^2/\sigma^2$ The signal-to-noise ratio for the variable Y is: $S/N_{Y,m} = (M_{Y,m})^2/V_{Y,m}$ The average of the variable Y is:

$$M_Y(m) = \partial M_Y/\partial m\ (m).m = \partial M_Y/\partial m\ (0).m \text{ for } m \ll 1 \text{ and}$$
$$M_Y(0) = 0 \text{ (because the function } f \text{ is odd)}$$

There are also:

$$\partial M_Y/\partial m\ (m) = \int_{[-\infty,+\infty]} f(x).\partial P_{X,m}/\partial m\ (x)\ dx$$

$$\partial M_Y/\partial m\ (m) = -\int_{[-\infty,+\infty]} f(x).P_{X,0}'(x-m)\ dx$$

$$\partial P_{X,m}/\partial m\ (x) = -P_{X,0}'(x-m) \text{ because } P_{X,m}(x) = P_{X,0}(x-m)$$

$$\partial M_Y/\partial m\ (0) = -\int_{[-\infty,+\infty]} f(x).P_{X,0}'(x)\ dx$$

The variance of the variable Y is:

$$V_Y(m) = \int_{[-\infty,+\infty]} f(x)^2.P_{X,0}(x)\ dx \text{ for } m \ll 1$$

For $m \ll 1$, the signal-to-noise ratio gain R between the variable Y and the variable X is given by the following relationship:

$$R = (S/N_{Y,m})/(S/N_{X,m}) = [\int_{[-\infty,+\infty]} f(x).P_{X,0}'(x)\ dx]^2/[\int_{[-\infty,+\infty]} f(x)^2.P_{X,0}(x)\ dx].\sigma^2$$

To optimize the signal-to-noise ratio R, the law $P_{X,0}(x)$ being given, the function f which maximizes the efficiency R is sought.

If it is taken that $R = C^2/\psi.\sigma^2$.

The optimization of R amounts to determining the optimal function f which minimizes the quadratic criterion: $\psi = \int_{[-\infty,+\infty]} f(x)^2.P_{X,0}(x)\ dx$ subject to the linear constraint: $C = \int_{[-\infty,+\infty]} f(x).P_{X,0}'(x)\ dx = 1$ The solution to this optimization problem is: $f_{optimal}(x) = \lambda.P_{X,0}'(x)/P_{X,0}(x)$ And, the maximum signal-to-noise ratio is:

$$R_{max}(P_{X,0}) = C^2/\psi.\sigma^2 = \int_{[-\infty,+\infty]} P_{X,0}'(x)^2/P_{X,0}(x)\ dx.\sigma^2.$$

The invention claimed is:

1. A receiver of signals likely to be disturbed by an interfering signal, the receiver comprising an interference rejection filter comprising a multiplying gain applied respectively to an in-phase channel and to an in-quadrature channel of a signal received and digitized by the receiver, the value of the multiplying gain being determined by a nonlinear function $K_i(\rho)$ of the modulus $\rho$ of the received signal, the function $K_i(\rho)$ being determined so as to maximize the signal-to-noise ratio after application of the multiplying gain and demodulation of the received signal.

2. The receiver of signals according to claim 1, wherein the nonlinear function $K_i(\rho)$ depends on the probability density $f(\rho)$ of the received signal, a function of the modulus $\rho$ of the signal.

3. The receiver of signals according to claim 2, wherein the interference rejection filter comprises a unit for computing the modulus of the received signal from the in-phase channel and from the in-quadrature channel of the received signal, the multiplying gain being implemented by a memory in which are saved a plurality of values of the nonlinear function $K_i(\rho)$, the memory having a first input linked to the output of the modulus computation unit.

4. The receiver of signals according to claim 2, wherein the multiplying gain is implemented by a memory in which are saved a plurality of values of the nonlinear function $K_i(\rho)$, the memory having a first input intended to receive the absolute value of the in-phase channel of the signal, a second input intended to receive the absolute value of the in-quadrature channel of the signal.

5. The receiver of signals according to claim 2, further comprising an estimator of a ratio J/N between the power of an interfering signal and the power of a thermal noise, the nonlinear function $K_i(\rho)$ depending on said ratio J/N.

6. The receiver of signals according to claim 5, wherein the estimator of a ratio between the power of an interfering signal and the power of a thermal noise comprises a unit for computing the fourth order moment of the modulus of the signal.

7. The receiver of signals according to claim 6, wherein the unit for computing the fourth order moment comprises an adder for summing the in-phase channel of the signal, raised to the power of 2, and the in-quadrature channel of the signal, raised to the power of 2, a multiplier for raising to the power of 2 the output of the adder and an averaging filter.

8. The receiver of signals according to claim 6, wherein the estimator of a ratio between the power of an interfering signal and the power of a thermal noise further comprises a member for computing the ratio between the fourth order moment of the signal and the second order moment of the signal raised to the power of 2.

9. The receiver of signals according to claim 8, comprising at least one automatic gain control device configured to control the amplitude of the received signal in accordance with a power setpoint, the second order moment of the signal being taken to be equal to the power setpoint of the automatic gain control.

10. The receiver of signals according to claim 5, wherein the probability density $f(\rho)$ of the modulus of the received signal is determined, for a plurality of values of the ratio J/N between the power of an interfering signal and the power of a thermal noise, from the value of the amplitude of the interfering signal and from the standard deviation of the thermal noise.

11. The receiver of signals according to claim 5, wherein the interference rejection filter comprises a unit for computing the modulus of the received signal from the in-phase channel and from the in-quadrature channel of the received signal, the multiplying gain being implemented by a memory in which are saved a plurality of values of the nonlinear function $K_i(\rho)$, the memory having a first input linked to the output of the modulus computation unit, and wherein the memory has an additional input linked to the output of the estimator of the ratio J/N.

12. The receiver of signals according to claim 1, wherein the nonlinear function $K_i(\rho)$ depends on the ratio between the derivative $f'(\rho)$ of the probability density of the received signal as a function of the modulus and the probability density $f(\rho)$ of the received signal, divided by the modulus $\rho$ of the received signal.

13. The receiver of signals according to claim 1, wherein the nonlinear function $K_i(\rho)$ depends on an a priori estimate of a ratio J/N between the power of an interfering signal and the power of a thermal noise.

14. The receiver of signals according to claim 1, wherein the interfering signal has a constant envelope.

15. The receiver of signals according to claim 1, wherein the received signals are satellite radionavigation signals.

16. A method for receiving signals likely to be disturbed by an interfering signal, comprising the steps of:
  receiving respectively an in-phase channel and an in-quadrature channel of a signal,
  computing a multiplying gain from a nonlinear function $K_i(\rho)$ of the modulus $\rho$ of the received signal, the nonlinear function $K_i(\rho)$ being determined so as to maximize the signal-to-noise ratio after application of the multiplying gain and demodulation of the received signal, applying the multiplying gain respectively to the in-phase channel and to the in-quadrature channel of the digitized signal.

17. The method for receiving signals according to claim 16, wherein the nonlinear function $K_i(\rho)$ depends on the probability density $f(\rho)$ of the received signal, a function of the modulus $\rho$ of the signal.

18. The method for receiving signals according to claim 16, wherein the nonlinear function $K_i(\rho)$ depends on the ratio between the derivative $f'(\rho)$ of the probability density of the received signal and the probability density $f(\rho)$ of the received signal, divided by the modulus $\rho$ of the received signal.

19. The method for receiving signals according to claim 16, further comprising a step of estimation of a ratio J/N between the power of an interfering signal and the power of a thermal noise, the nonlinear function $K_i(\rho)$ depending on said ratio J/N.

* * * * *